Figure 1:
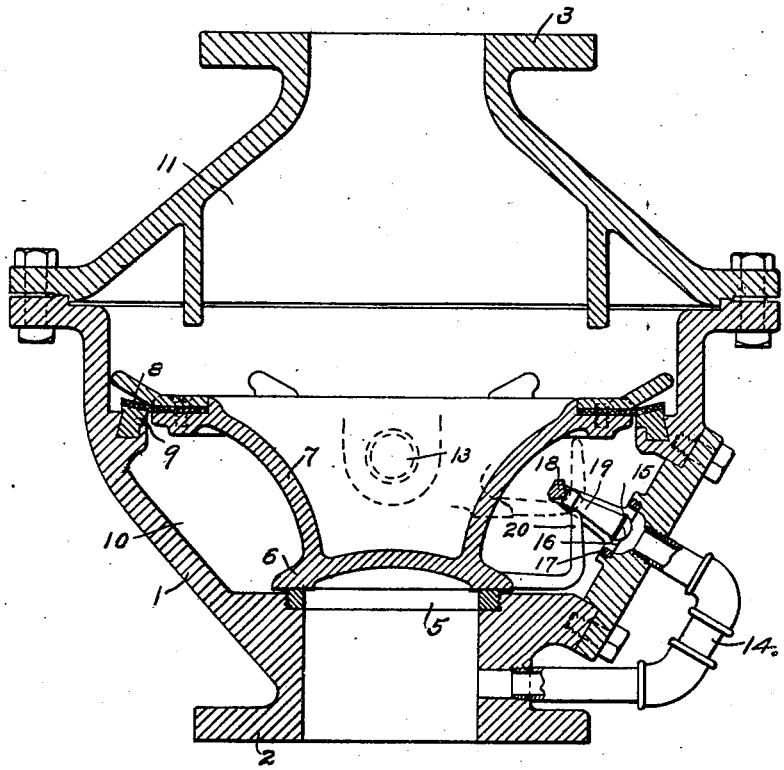

No. 677,078. Patented June 25, 1901.
F. GRINNELL.
VALVE.
(Application filed Dec. 17, 1897.)

(No Model.)

WITNESSES,
John Henshaw
R. A. Bates.

INVENTOR,
Frederick Grinnell,
BY Wilmarth H. Thurston,
ATT'Y.

UNITED STATES PATENT OFFICE.

FREDERICK GRINNELL, OF NEW BEDFORD, MASSACHUSETTS, ASSIGNOR TO THE GENERAL FIRE EXTINGUISHER COMPANY, OF NEW YORK, N. Y.

VALVE.

SPECIFICATION forming part of Letters Patent No. 677,078, dated June 25, 1901.

Application filed December 17, 1897. Serial No. 662,338. (No model.)

*To all whom it may concern:*

Be it known that I, FREDERICK GRINNELL, of New Bedford, in the county of Bristol and State of Massachusetts, have invented certain new and useful Improvements in Valves; and I do hereby declare the following specification, taken in connection with the accompanying drawings, forming a part of the same, to be a full, clear, and exact description thereof.

The invention relates to that class of valves in which a liquid, usually water, under pressure is held in check by a valve which is held to its seat by the action of a less pressure and is released and forced from its seat by the action of the liquid when said light pressure is reduced. Such valves are especially useful in connection with automatic sprinkler systems in which the water is held in check by a valve held to its seat by the action of a light air-pressure in the system, and the present invention is especially designed for use in connection with such systems, although its use is not confined thereto.

Valves of the above class are usually provided with a movable member, which is subjected upon one side to the light pressure in the system and upon the other side to a less pressure, usually about atmospheric, said movable member being arranged to hold the valve closed by reason of its greater area or by reason of the connections between said member and the valve. When such a valve is opened by the reduction of the light pressure in the system, the system is filled with water and a column of water is formed above the movable member. Should the valve for any reason now return to its seat, the column of water above the movable member may be of sufficient height to hold the valve to its seat and prevent any further flow of water to the system. A valve thus held to its seat is said to be "columned." With this class of valves it is desirable, especially in connection with fire-extinguisher systems, where it is essential that the supply of water shall not be prematurely shut off after the valve has been opened by the opening of a sprinkler, to provide means for preventing columning.

The object of the present invention is to provide simple and efficient means for preventing the columning of the valve, and this is accomplished by providing a passage from the supply to the supplemental or intermediate chamber, which is normally closed, but which is opened upon the reduction of the pressure holding the valve to its seat and remains open even if the valve should close for any reason. Any suitable means may be employed for normally closing the passage between the supply and the supplemental chamber which will operate or be operated to open said passage upon the reduction of the pressure holding the valve to its seat. It is preferred, however, to operate this means by the action of the valve in opening, as with this construction there is no possibility that the passage will not be opened whenever the valve opens.

In the accompanying drawings one embodiment of the present invention in its preferred form is shown in connection with a valve similar to that shown in Figure 1 of my Patent No. 372,220, dated October 25, 1887; but it will be understood that the invention may be used with equal advantage in connection with the various forms of valves shown in said patent or in other forms of valves wherein a liquid under pressure is held in check by a valve which is held closed by the action of a less pressure.

The construction shown embodies certain features of invention set forth in the claims of an application of even date herewith, Serial No. 662,336.

Figure 2:
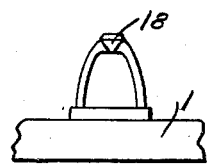

Referring to the drawings, Fig. 1 is a sectional view showing the preferred form of the present invention applied to a differential valve, and Fig. 2 is a detail.

The valve-casing 1 is provided with flanges 2 and 3 for connecting said casing to a supply-pipe and delivery-pipe, respectively. The inlet 4 is provided with a valve-seat 5 for a valve 6. The valve 6 is formed on a dish-shaped member 7, which is provided with a flexible ring 8, arranged to seat upon the valve-seat 9. In this form of valve the member 7 and the wall of the casing 1 between the valve-seats 5 and 9 form an intermediate or supplemental chamber 10, and the space above the member 7 forms a light-pressure chamber 11, which is connected with the system through the outlet 12. The chamber 10 is preferably connected with the atmosphere through the usual drip-pipe 13; but the pressure in said chamber may, if desired, be either above or below atmospheric pressure, provided said pressure is less than the pressure in chamber 11. The walls of the movable member 7 between the chambers 10 and 11 are subjected to light pressure on one side and to a less pressure on the other side, and the member 7 is connected to the main valve by being formed integral therewith. The valve-seat 9 is of such a diameter that the pressure upon the top of the member 7 exerted by the light pressure will be sufficient to hold the valve 6 to its seat.

As thus far described the valve is of a well-known construction in common use and is merely shown as an illustration of one of many forms of valves to which the invention may be applied. The means for preventing columning of the valve embodying the present invention will now be described.

A passage in the form shown, consisting of piping 14, leads from the casing 1 below the valve-seat 5 to the chamber 10. This passage is normally closed by a spherical valve 15, which engages a valve-seat formed in the diaphragm 16 at the mouth of the passage. The diaphragm is held in position by a ring 17, which also carries a yoke 18. The valve 15 is provided with a valve-stem 19, which engages the yoke 18 and forms a strut for holding the valve to its seat.

An arm 20 is secured to the valve 6 and is arranged to engage the valve-stem 19. When the pressure in the system and chamber 11 is reduced—by the opening of a sprinkler, for instance—the valve 6 opens under the action of the liquid below said valve, and the arm 20 forces the valve-stem 19 out of engagement with the yoke 18 and the valve drops away from the diaphragm 16, thus opening the passage between the supply and the chamber 10. Should the valve 6 now close for any reason, the column of water above the valve will not act to hold the valve to its seat against the pressure in the supply-pipe, for the reason that the pressure in chamber 10 is the same as the pressure in the supply-pipe after the valve has once opened. In other words, when the valve has once opened it cannot become columned, for the reason that the differential feature no longer exists, owing to the open passage from the supply to the chamber 10, and the valve-ring 8 will act as a mere check-valve to prevent flow of water from the system to the supply-pipe, but will not interfere with the flow of water from the supply to the system.

While it is preferred to open the passage from the supply to the supplemental or intermediate chamber by the action of the valve in opening and to use the form of valve shown for normally closing the passage, it will be understood that the passage might be opened in other ways when the pressure in the system is reduced, or other forms of valves might be used without departing from the spirit of the invention, which, broadly stated, consists in opening a passage between the supply and supplemental or intermediate chamber upon the reduction of the pressure which holds the main valve to its seat, which passage is not closed should the main valve close.

What I claim as my invention, and desire to secure by Letters Patent, is—

1. The combination with a valve, a light-pressure chamber, a supplemental chamber, a movable member between said chambers acting to hold said valve closed, a passage from the supply to the supplemental chamber, and means normally closing said passage and operating upon the reduction of pressure in the light-pressure chamber to open said passage.

2. The combination with a valve, a light-pressure chamber, a supplemental chamber, a movable member between said chambers acting to hold said valve closed, a passage from the supply to said supplemental chamber, means normally closing said passage, and operated by the movement of the valve in opening to open said passage.

3. The combination with a differential valve, of a supplemental chamber closed by said valve, a passage from the supply to said chamber, means for normally closing said passage and operating to open said passage upon the reduction of the pressure holding said valve closed.

4. The combination with a differential valve, of a supplemental chamber closed thereby, a passage from the supply to said chamber, means normally closing said passage and operated by the movement of the valve in opening to open said passage.

5. The combination with a valve, of a light-pressure chamber a supplemental chamber, a movable member between said chambers for holding said valve closed by the action of the light pressure, a passage between the supply and supplemental chamber, a valve normally closing said passage and opened by the movement of the main valve in opening.

6. The combination with a differential valve, of a supplemental chamber closed thereby, a passage from the supply to said chamber, a valve in said chamber normally closing said passage, and an arm on the main valve for engaging and releasing said latter valve.

FREDERICK GRINNELL.

Witnesses:
W. H. THURSTON,
R. A. BATES.